Patented Nov. 28, 1933

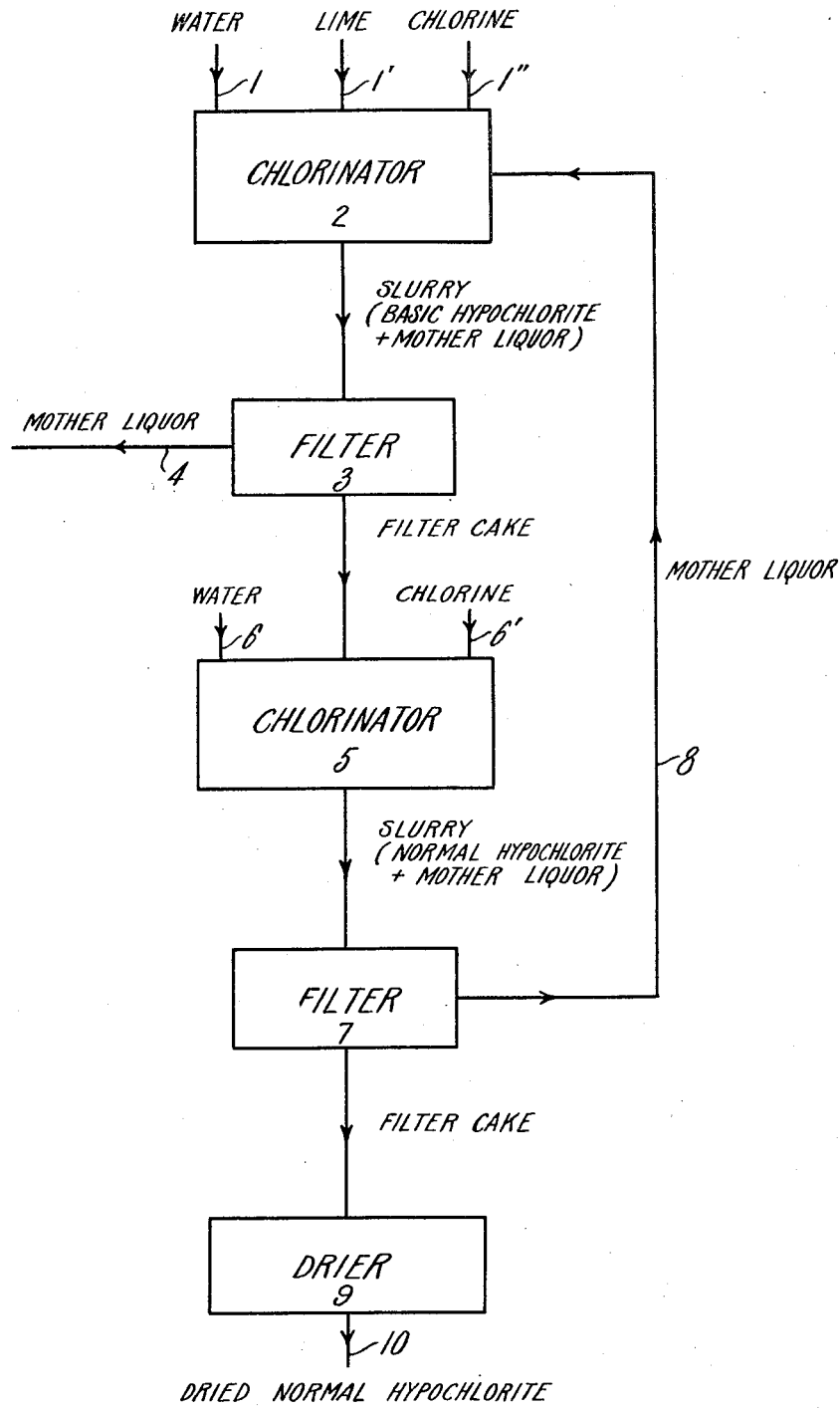

1,937,230

UNITED STATES PATENT OFFICE 1,937,230

MANUFACTURE OF CALCIUM HYPOCHLORITE

Francis Noel Kitchen, Pensby, England, assignor to Imperial Chemical Industries, Limited, a corporation of Great Britain Application July 18, 1931, Serial No. 551,766, and in Great Britain July 24, 1930

3 Claims. (Cl. 23—86)

This invention relates to the manufacture of calcium hypochlorite; and it comprises a process wherein a suspension of lime in water is chlorinated to produce a precipitate of basic calcium hypochlorite, the said basic hypochlorite is separated from the mother liquor, suspended in water and further chlorinated to produce solid normal calcium hypochlorite which is then recovered, and it further comprises a cyclic process wherein the solid normal hypochlorite, as obtained from the stated process, is separated from its mother liquor, the said mother liquor is treated with lime and chlorine to produce a precipitate of basic hypochlorite which is then separated from its mother liquor, suspended in water and chlorinated in a repetition of the process; all as more fully hereinafter set forth and as claimed.

The chlorination of lime suspensions to produce calcium hypochlorite is well known. Calcium hypochlorite is, in fact, one of the oldest and best known disinfectants. In a common way of making this chemical, lime is placed in suspension and is chlorinated until normal calcium hypochlorite is precipitated, this precipitate being then filtered off and recovered. During chlorination of the lime suspension, calcium chloride is produced in the solution and, upon filtration of the precipitated normal calcium hypochlorite, an appreciable quantity of calcium chloride remains in the filter cake as an impurity. The presence of this calcium chloride in the calcium hypochlorite not only lessens the purity of the product but is detrimental to its stability.

I have found that the above process can be improved by chlorination of a lime suspension only to the point at which a basic calcium hypochlorite is precipitated. This precipitate is filtered off from the mother liquor which contains calcium chloride and is then suspended in water and again chlorinated to the point at which normal calcium hypochlorite is precipitated. This is then filtered off from its mother liquor which contains considerably less quantities of calcium chloride. A purer product results. The mother liquor from the second chlorination may be advantageously recycled by treating it with lime and chlorine to form precipitated basic hypochlorite which is then filtered off and treated in a repetition of the process. In this process all the calcium recovered in the final normal hypochlorite product has been previously separated as a basic hypochlorite at one stage in the process. The normal calcium hypochlorite, moreover, is precipitated in and filtered from a mother liquor containing less calcium chloride than in a process wherein the basic hypochlorite is not recovered and separately chlorinated.

The actual chlorinating cycle of my invention can be started in any one of several ways. Thus, a suspension of lime in water may be chlorinated to produce solid basic hypochlorite which may then be separated from the mother liquor and suspended in water for further chlorination. Alternatively, a suspension of lime in water may be chlorinated to produce normal hypochlorite (which may all be in solution, or partly in solution and partly precipitated); any solid hypochlorite may be separated from the solution and the mother liquor then treated with lime and chlorine to precipitate basic hypochlorite, which may then be separated from the mother liquor and suspended in water ready for further chlorination.

In this specification the term "basic hypochlorite" is used to indicate a compound or mixture of compounds of calcium hydroxide with calcium hypochlorite and is not intended to be confined to one compound.

My invention comprises the steps of separating basic hypochlorite produced by any of the above methods, suspending it in water and chlorinating the resulting suspension to produce solid normal hypochlorite. The proportions of basic hypochlorite, lime and water are preferably arranged so that solid normal calcium hypochlorite is precipitated, although the chlorination may be conducted in the presence of so much water that the hypochlorite remains in solution and is afterwards precipitated by evaporation.

The solid normal calcium hypochlorite produced is separated. It may be pressed and dried in a current of hot air or treated in any other known manner for removal of adherent mother liquor and for drying the product.

Basic hypochlorite required for continuing the cycle of operations is produced by addition of lime to the mother liquor remaining after the separation of the normal salt. At this point there may also be introduced into the cycle a further quantity of normal hypochlorite solution prepared externally by the separate chlorination of a milk of lime. Alternatively the lime may be added in the form of a slurry to the mother liquor and the mixture, with or without separation of the basic hypochlorite from the mother liquor, subjected to chlorination, the chlorination being stopped while solid basic hypochlorite is still present in the slurry.

Residual liquors after separation of the basic hypochlorite may be discarded but are preferably worked up to yield chlorates.

As mentioned previously there is an important advantage gained in forming the normal hypochlorite from a basic hypochlorite which is isolated as an intermediate product, e. g. as a filter cake, since this allows of the rejection from the cycle at this stage as mother liquor of a substantial quantity of calcium chloride so that the filter cake of normal hypochlorite is obtained in a purer form, containing less calcium chloride. Moreover according to my invention the normal hypochlorite is obtained in a readily filterable form, whereas former methods have always led to the production of normal hypochlorite in small crystals from which the mother liquor cannot easily be separated, thereby rendering subsequent drying difficult and leading to products of low stability on account of the presence of residual calcium chloride. These drawbacks are avoided by the present invention.

Example

The process of this example is represented diagrammatically by the appended flow sheet. Raw materials are introduced at two points in the cycle namely, water, lime and chlorine as represented by the inlets or lines of flow 1, 1' and 1'' to the chlorinator 2, and water and chlorine as represented by the inlets or lines of flow 6 and 6' to the chlorinator 5.

128.5 lbs. of dressed lime containing about 94 per cent $Ca(OH)_2$ is mixed with 280 lbs. of water and well agitated in the chlorinator 2, while 58.5 lbs. of chlorine is led in, keeping the temperature at about 30° C. The resulting sludge or slurry of basic hypochlorite and mother liquor is led to and filtered by the filter 3 to give 120 lbs. of cake containing about 35 per cent available chlorine and consisting essentially of basic hypochlorite and adherent mother liquor. Residual liquor from this filtration is represented by the outlet line of flow 4 and passes from the cycle. The cake of basic hypochlorite is mixed with 240 lbs. of water in the chlorinator 5 and well agitated while 53 lbs. of chlorine is led in, the temperature being kept about 30° C. to produce a sludge containing normal calcium hypochlorite. This sludge is now treated on the filter 7 to yield 70 lbs. of cake and 340 lbs. of mother liquor containing about 14 per cent available chlorine and 11 per cent calcium chloride. The cake is dried in the drier 9, to a final product, 10, containing about 75 per cent available chlorine. To the mother liquor, which is returned to the chlorinator 2 as represented by the flow line 8, there is added 74.5 lbs. dressed lime and 38 lbs. water and the mixture well agitated while 10.5 lbs. chlorine is led in to produce a slurry containing basic hypochlorite. The slurry is filtered in 3 giving 120 lbs. of basic hypochlorite cake to continue the cycle.

I claim:—

1. In the manufacture of calcium hypochlorite, the process which comprises chlorinating a suspension of lime in water to produce basic calcium hypochlorite, separating said basic hypochlorite from the mother liquor, suspending it in water and chlorinating the suspension to produce normal calcium hypochlorite.

2. A cyclic process for the production of substantially normal calcium hypochlorite which comprises chlorinating basic calcium hypochlorite in aqueous suspension to produce solid normal calcium hypochlorite, separating said solid normal hypochlorite from the mother liquor, treating said mother liquor with lime and chlorine to produce solid basic calcium hypochlorite, separating said solid basic hypochlorite from the liquor, suspending it in water and again chlorinating it in a repetition of the process.

3. In the manufacture of calcium hypochlorite, the process which comprises chlorinating a suspension of lime in water to produce basic calcium hypochlorite substantially free from uncombined calcium hydroxide, separating said basic hypochlorite from the mother liquor, suspending it in water and chlorinating the suspension to produce normal calcium hypochlorite.

FRANCIS N. KITCHEN.